United States Patent [19]

Kogge

[11] 4,370,732
[45] Jan. 25, 1983

[54] SKEWED MATRIX ADDRESS GENERATOR

[75] Inventor: Peter M. Kogge, Endicott, N.Y.

[73] Assignee: IBM Corporation, Armonk, N.Y.

[21] Appl. No.: 187,256

[22] Filed: Sep. 15, 1980

[51] Int. Cl.³ .............................................. G06F 9/34
[52] U.S. Cl. .................................................. 364/900
[58] Field of Search ... 364/200 MS File, 900 MS File

[56] References Cited

U.S. PATENT DOCUMENTS

3,651,495  3/1972  Sauvan ............................... 364/900
4,069,970  1/1978  Buzzard ............................. 364/900

Primary Examiner—Harvey E. Springborn
Attorney, Agent, or Firm—M. H. Klitzman; J. E. Hoel

[57] ABSTRACT

An address generator for an M-interleaved memory for accessing row or column elements of a matrix stored in a skewed matrix pattern includes an apparatus for circularly shifting the addresses for the $i^{th}$ row of a matrix by $s(i-1)$ positions so that both row and column elements of the matrix can be accessed at the same access rate. In other words, apparatus is provided for circularly generating the sequences of appropriate memory addresses for the desired row or column elements so that either the row or column elements can be accessed at the memory system's maximum access rate. The apparatus includes a base register having an input connected to a first adder which adds an input value A to the contents in the base register for storing the output of the adder as a pointer to the beginning of the current row of the matrix in the memory to be accessed. The apparatus further includes an index register having an input connected to an adder for adding an input value B to the contents of the index register and that sum is conditionally added in a third adder to an input value C which sum is then stored in the index register for indicating which column element in the matrix is to be accessed. The apparatus further includes an adder having inputs connected to the base register and the index register for generating the skewed matrix address to be accessed. The resulting apparatus enables both row and column elements of the matrix to be accessed at substantially the same rate.

2 Claims, 9 Drawing Figures

FIG. 1 INTERLEAVED MEMORY

FIG. 2 SEQUENTIAL ACCESSING OF 4 WAY INTERLEAVED MEMORY

FIG. 3  MATRIX STORAGE BY ROWS

DEFINE MATRIX AS 4 X 4 MATRIX

| MEMORY LOCATION | ELEMENT STORED THERE |
|---|---|
| 0 | A(1,1) |
| 1 | A(1,2) |
| 2 | A(1,3) |
| 3 | A(1,4) |
| 4 | A(2,1) |
| 5 | A(2,2) |
| 6 | A(2,3) |
| 7 | A(2,4) |
| 8 | A(3,1) |

EQUIVALENT REPRESENTATION

DISPLACEMENT WITHIN MODULE

| | MEMORY MODULE # | | | |
|---|---|---|---|---|
| | 0 | 1 | 2 | 3 |
| 0 | A(1,1) | A(1,2) | A(1,3) | A(1,4) |
| 1 | A(2,1) | A(2,2) | A(2,3) | A(2,4) |
| 2 | A(3,1) | A(3,2) | A(3,3) | A(3,4) |
| 3 | A(4,1) | A(4,2) | A(4,3) | A(4,4) |

ELEMENT STORED IN THIS LOCATION

FIG. 4

(a) ACCESSING A ROW (b) ACCESSING A COLUMN

FIG. 5    SKEWED STORAGE S=1

| MEMORY LOCATION | ELEMENT STORED |
|---|---|
| 0 | A(1,1) |
| 1 | A(1,2) |
| 2 | A(1,3) |
| 3 | A(1,4) |
| 4 | A(2,4) |
| 5 | A(2,1) |
| 6 | A(2,2) |
| 7 | A(2,3) |
| 8 | A(3,3) |
| 9 | A(3,4) |
| 10 | A(3,1) |
| 11 | A(3,2) |
| 12 | A(4,2) |
| 13 | A(4,3) |
| 14 | A(4,4) |
| 15 | A(4,1) |
| 16 | |
| ⋮ | |

EQUIVALENT REPRESENTATION
MEMORY MODULE #

| DISP. | 0 | 1 | 2 | 3 |
|---|---|---|---|---|
| 0 | A(1,1) | A(1,2) | A(1,3) | A(1,4) |
| 1 | A(2,4) | A(2,1) | A(2,2) | A(2,3) |
| 2 | A(3,3) | A(3,4) | A(3,1) | A(3,2) |
| 3 | A(4,2) | A(4,3) | A(4,4) | A(4,1) |

FIG. 6

(a) ACCESS OF ROW 2

(b) ACCESS OF COLUMN 3

FIG.9

SKEWED MATRIX ADDRESS GENERATOR

FIELD OF THE INVENTION

The invention disclosed broadly relates to computer architecture and more particularly relates to computers for carrying out matrix manipulations.

BACKGROUND OF THE INVENTION

The conventional manner of storing a matrix in a digital computer's memory is by storing the matrix elements in rows with individual matrix elements of each row stored in consecutive memory locations. A problem arises when a decrease in the effective access time of a memory is attempted by interleaving M memory modules (each having N words) into one memory with all locations whose addresses are of the form KM being in one module, the locations of the form KM+1 being in another module and so on. When each of the elements of a row in a matrix are stored in consecutive, interleaved modules of an interleaved memory, the accessing of a matrix row can proceed at a very rapid rate, i.e., M elements of the row are returned in one memory module access time. However, the "corner turning" problem occurs when it is a column that is desired to be accessed rather than a row. Since all of the matrix elements of a column are in the same memory module, the interleaved operation of the overall memory will not speed up the access rate for the matrix column (only one column element returned in one memory module access time).

In most pipelined signal or vector matrix processors, the data must originate at some point in a single main memory and the answers must return there. Since memory technology speeds are increasing at a slower rate than processor logic technology, there is an increasing gap between processor and memory speeds. The primary technique to speed up memories is interleaving. But this interleaving technique fails to solve the problem of accessing either row or column components of a matrix at the same fast rate. The memory is the bottleneck in the state of the art matrix processor.

OBJECTS OF THE INVENTION

It is therefore an object of the invention to perform a fast access to various components of a matrix without any intervening processing.

It is still another object of the invention to provide a fast access to various components of a matrix without requiring a redesign of a conventional interleaved memory in which the elements are stored.

It is still a further object of the invention to provide a fast access to the various components of a matrix so as to enable the data accessed therefrom to be in "natural order" without the need for time consuming reordering operations.

SUMMARY OF THE INVENTION

These and other objects, features and advantages of the invention are accomplished by the skewed matrix address generator disclosed herein. An address generator for an M-interleaved memory for accessing row or column elements of a matrix stored in a skewed matrix pattern includes an apparatus for circularly shifting the, addresses for the $i^{th}$ row of a matrix by the amount s times (i−1), where s is the skew factor applied to the matrix, and i is the index to the $i^{th}$ row, positions so that both row and column elements of the matrix can be accessed at the same access rate. In other words, apparatus is provided for circularly generating the sequences of appropriate memory addresses for the desired row or column elements so that either the row or column elements can be accessed at the memory system's maximum access rate. The apparatus includes a base register having an input connected to a first adder which adds an input value A to the contents in the base register for storing the output of the adder as a pointer to the beginning of the current row of the matrix in the memory to be accessed. The apparatus further includes an index register having an input connected to an adder for adding an input value B to the contents of the index register and that sum is conditionally added in a third adder to an input value C which sum is then stored in the index register for indicating which column element in the matrix is to be accessed. The apparatus further includes an adder having inputs connected to the base register and the index register for generating the skewed matrix address to be accessed. The resulting apparatus enables both row and column elements of the matrix to be accessed at substantially the same rate.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
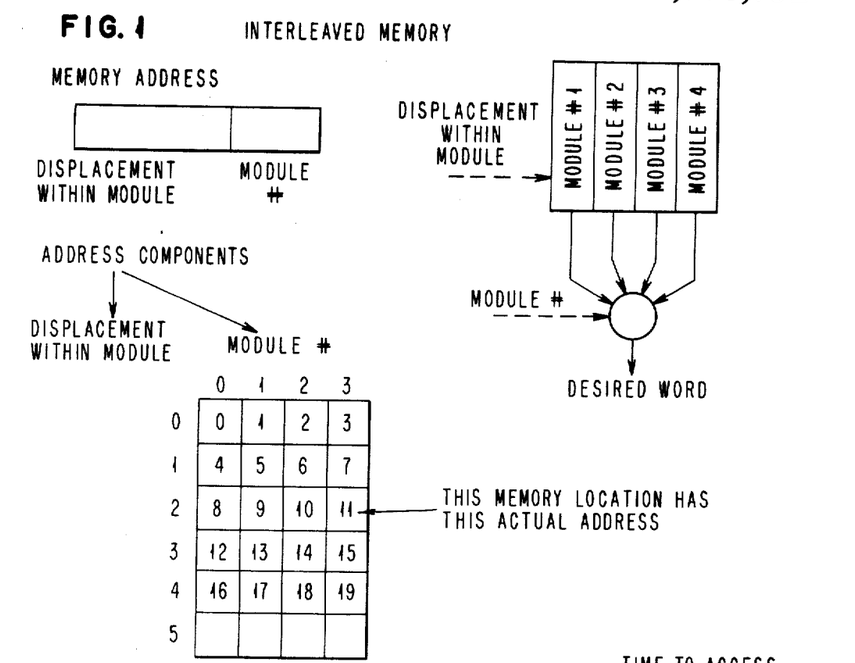
FIG. 1 is a schematic diagram of a simple four-way interleaved memory.
Figure 2:
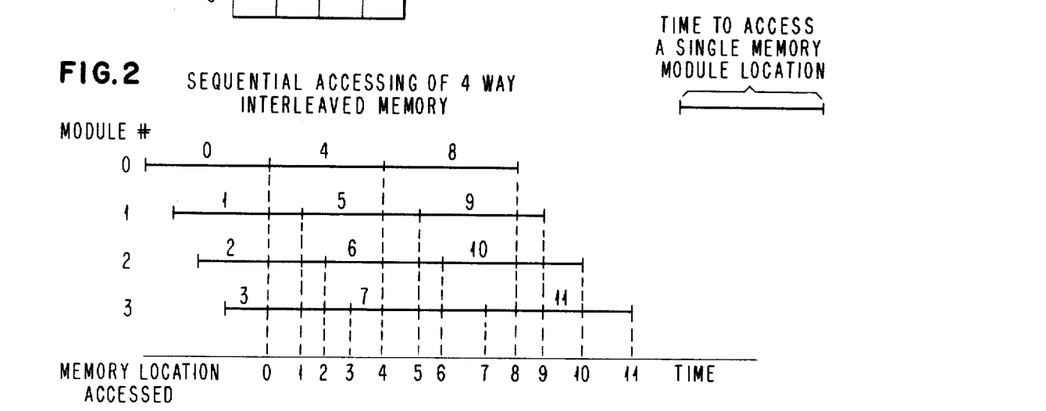
FIG. 2 is a timing diagram illustrating the sequential accessing of the four-way interleaved memory of FIG. 1.

One version of the "corner turning problem" deals with the speed at which various subsets of a matrix can be read out of an interleaved memory. An M-way interleaved memory is one in which there are M memory modules (each having N words) in one memory and all locations whose addresses are of the form KM are in one module, locations of the form KM+1 in another, KM+2 in a third, and so on up to KM+M−1. FIG. 1 diagrams a simple four-way interleaved memory. The advantage of such a memory system is that for access to sequential words it runs M times faster than for a memory system having groups of N consecutive words in one module. FIG. 2 diagrams this situation.

Figure 3:
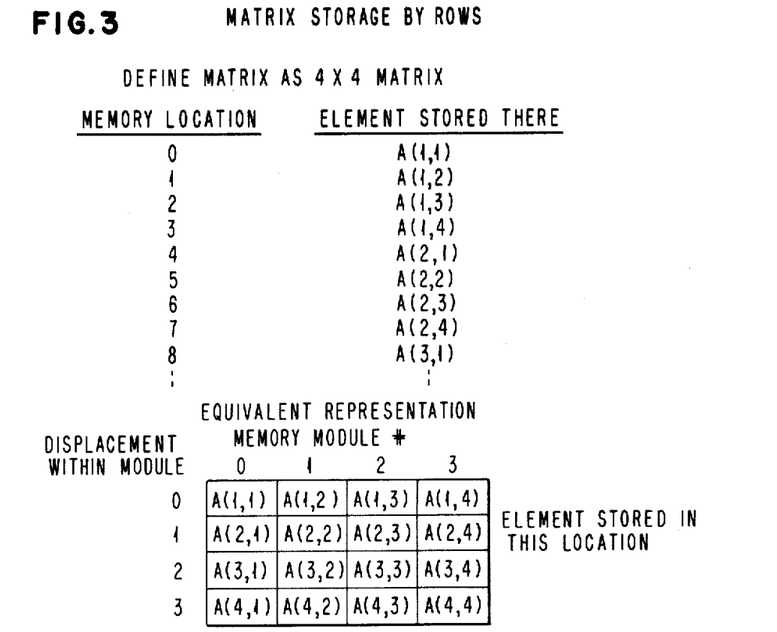
FIG. 3 is a schematic diagram illustrating the storage of a matrix by rows.

FIG. 3 diagrams the conventional way of storing a matrix (of size 4×4 in this example) in such a memory.

This is called "storage by rows" since individual elements of each row are in consecutive locations. An obvious alternative is "storage by columns."

Figure 4:
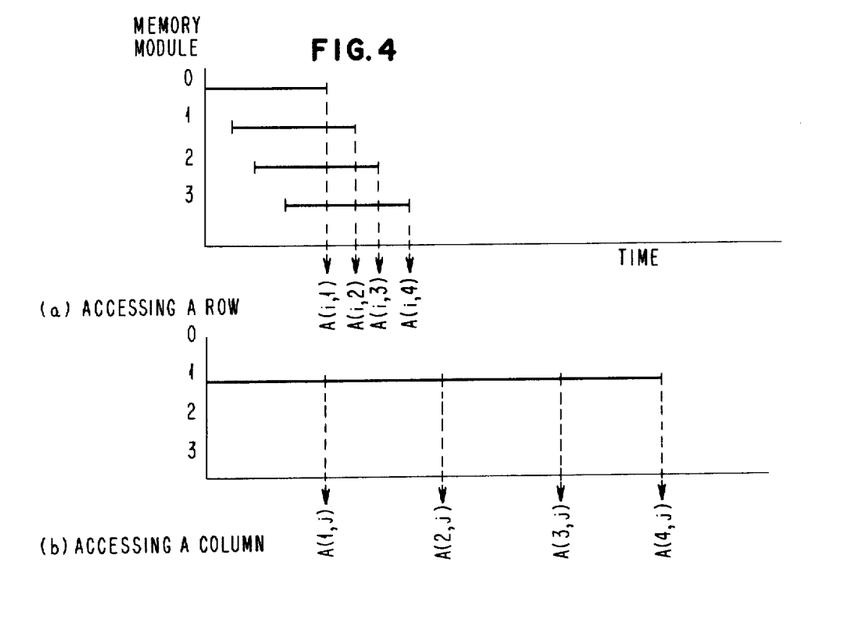
FIG. 4 is a timing diagram illustrating accessing a matrix stored by rows.

It is clear that the accessing of a row or part of a row of a matrix when it is stored by row in such a memory can proceed at a very high rate. The words for a row are in sequential locations and can be accessed as shown in FIG. 2. The "corner turning" problem occurs when it is a column that is desired rather than a row. In the 4×4 case of FIG. 3 all the elements of a column are in the same memory module, which means that we cannot run all memories in parallel, and the system speed is only the speed of one module. FIG. 4 diagrams the timing for this case.

In general, assume we have a pxq matrix stored by rows in an M-way interleaved memory where to access a single location in a single module takes C time units. Addresses may be submitted to the memory and rows may be read out at a rate of one element every C/M seconds. However, if q (the number of elements in a row) is an integer multiple of M, then columns can be read out only at a rate of one element every C seconds, since they all reside in the same module. Further, for other ratios of q and M other slowdowns will occur, although not as bad as the above case.

The "corner turning" problem would be solved if a memory scheme was developed whereby any row or column of a matrix could be accessed at the same fast rate, namely C/M seconds per element.

Skewed Matrix Storage

A data organization technique known as "skewed matrix storage" was developed for a plurality of simultaneously accessed parallel memories, each respectively connected to its own processor in a multiprocessing system (such as is found in the ILLIAC IV, as described in G. H. Barnes, et al., "ILLIAC IV Computer," IEEE Transaction Computers, No. C-17, pages 746–757, 1968). The data organization technique provides the mathematical foundation for the sequential address generator apparatus disclosed herein which solves the corner turning problem in an M-way, sequentially interleaved memory connected to a single, pipelined processor. The address generating apparatus disclosed herein provides a sequential access to the matrix elements in natural order, so that no additional data shifting operations are required.

The solution to the corner turning problem for a pxq matrix stored in an M-way interleaved memory, is to take the addresses of the $i^{th}$ row of the matrix and circularly shift them $s(i-1)$ positions. The item "s" is the skew factor. These circularly shifted rows are then stored in memory by row as before. For a pxq matrix (starting with A(1,1)), with a skew factor s, element A(i,j) is stored at memory location:

$$q(i-1)+(j-1+(i-1)s) \bmod q$$

Figure 5:
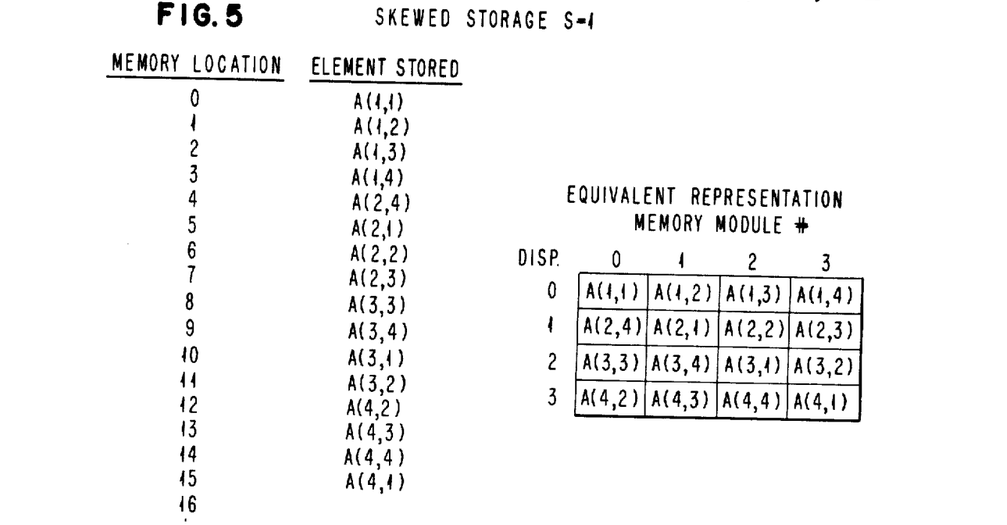
FIG. 5 is a schematic diagram illustrating skewed storage in accordance with the invention.
Figure 6:
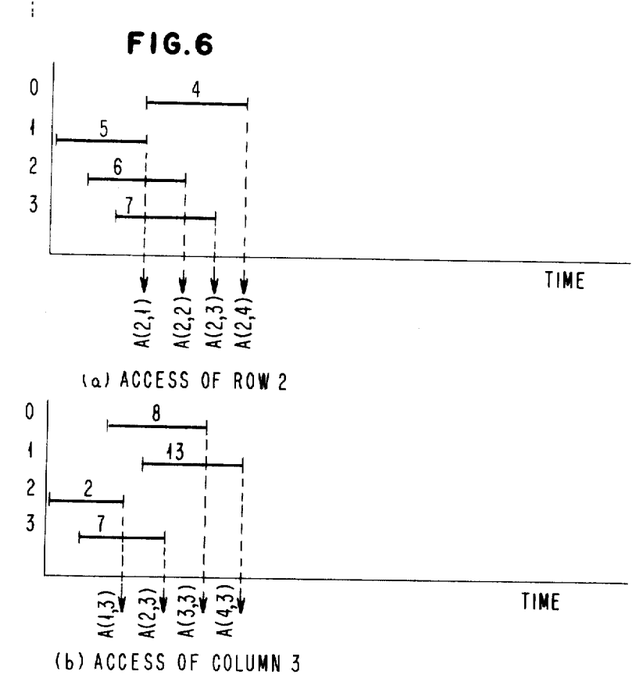
FIG. 6 is a sequencing diagram illustrating the operation of accessing a matrix in skewed storage of FIG. 5.
Figure 7:
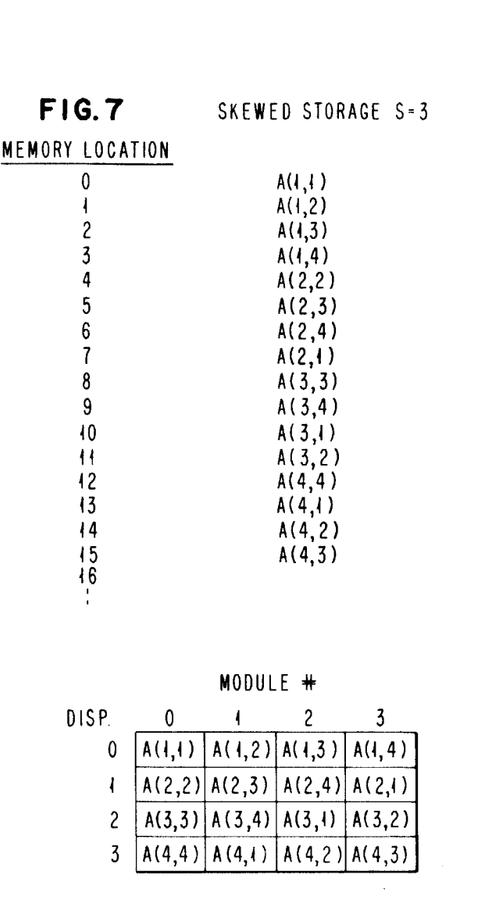
FIG. 7 is a schematic diagram of an alternate embodiment for skewed storage, in accordance with the invention.

As an example, FIG. 5 diagrams a 4×4 matrix stored with s=1. This should be compared with FIG. 3. FIG. 6 diagrams how row 2 and column 3 might be read out of such a memory. In both cases the rate is C/M seconds per element. It is easy to see that all other rows and columns can be accessed at the same rate. FIG. 7 diagrams the same matrix except with s=3. Again both rows and columns can be accessed at maximum rate.

The value of s we pick should be such that when accessing a column, any group of M consecutive column elements fall in M different memory modules.

Mathematically we define the function g of parameter s as a number:

$$g(s)=(q+s) \bmod M=((q \bmod M)+s) \bmod M$$

and demand that we find an s such that g(s) is a generator of the group $Z_M$ (integers 0 to M−1 under addition modulo M). By a generator we mean:

$$\{Kg(s) \bmod M \mid 0 < K < M-1\} = Z_M$$

We note that we need only try values of s in the range 0 to M−1. Table I lists for some typical values of M all possible generators.

With such skew factors and corresponding generator, sequential elements of a column of a pxq matrix stored in row order are separated by g(s) modules in the memory. The generator property then guarantees that any specific module will not be accessed twice without all other modules in the memory accessed in between.

TABLE I

| Table of Generators of $Z_M$ | |
|---|---|
| M | Generator |
| 2 | 1 |
| 3 | 1,2 |
| 4 | 1,3 |
| 5 | 1,2,3,4 |
| 6 | 1,5 |
| 7 | 1,2,3,4,5,6 |
| 8 | 1,3,5,7 |
| 9 | 1,2,4,5,7 |

Example: 3 generates $Z_8$ since:

$3 \times 1 = 3$ $3 \times 2 = 6$ $3 \times 3 = 1$ $3 \times 4 = 4$ $3 \times 5 = 7$ $3 \times 6 = 2$ $3 \times 7 = 5$ $3 \times 8 = 0$ For any value of M, g generates $Z_M$ if $1 = \gcd(g,M)$, where gcd="greatest common division" function.

Note that for M a power of 2, g(s) need only be odd. Thus since most real memory systems have M a power of 2, we need picks as 0 or 1 depending on whether q is odd or even respectively to begin with.

For more detailed discussions of this and other skewing schemes (cast in the framework of a parallel memory rather than single port interleaved memory) see Budnik and Kuck, *IEEE Transactions on Computer*, December 1971, pp. 1566–1569.

Address Generator Implementation

Figure 8:
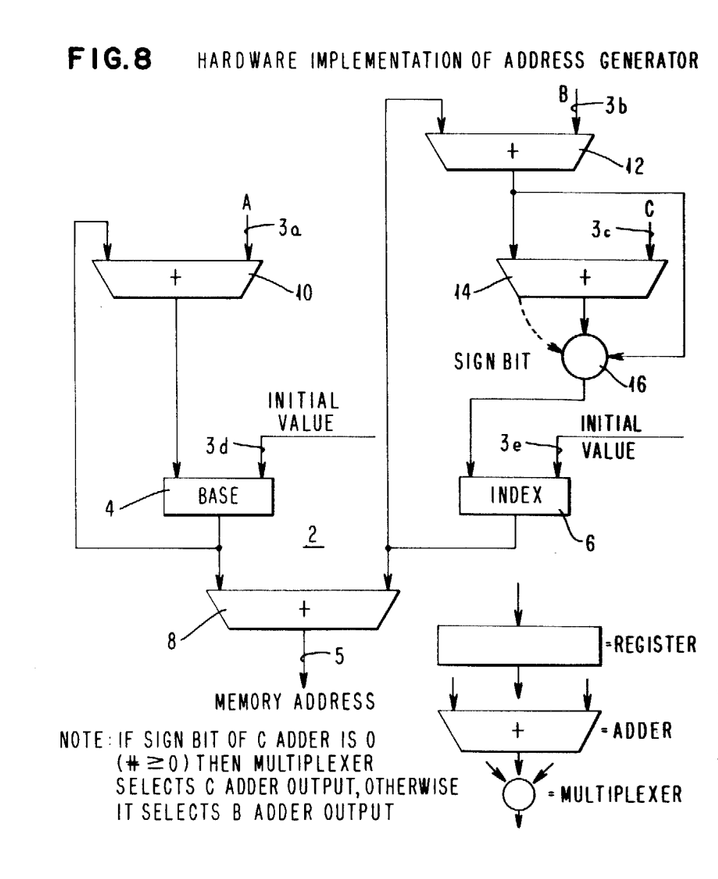
FIG. 8 is a functional block diagram of the skewed matrix address generator.

This section describes the address generator 2 apparatus which automatically generates from a small initial set of parameters the sequential sets of addresses needed to access rows/column/subsets of matrices stored in optimal skewed fashion. Further, the generator 2 processes results which come out in natural order (i.e., starting with the first element, followed by the second, etc.) and do not need to be unscrambled. The device supplying/receiving the data need not know that the matrix is skewed, or that the data is actually stored by rows or columns. FIG. 8 diagrams the implementation of the generator 2. There are two registers, BASE 4 and INDEX 6.

Conceptually, the BASE 4 points to the beginning of the current row of the matrix in memory, and INDEX 6 indicates which column element is desired. At each clock pulse (a clock pulse occurs every C/M seconds) a new address is to be generated by the adder 8 from the sum of BASE 4 and INDEX 6. Simultaneously both BASE 4 and INDEX 6 are independently modified for the next address. The three inputs A, B and C specify this modification process. At each clock pulse, BASE 4 is added by adder 10 to A, and the sum stored in BASE 4. At the same time B is added to INDEX by adder 12, and this sum added by adder 14 to C. If this result is not negative as determined by the sign comparator 16, then it is stored back in INDEX 6. If it is negative, the intermediate sum B+INDEX is stored back in INDEX. The multiplexer 16 makes this choice on the basis of the sign of the result computed by adder 14. This second adder/selection is basically performing a modulo operation (INDEX+B) mod C.

The following paragraphs describe examples of the parameters needed, and the detailed operations, to perform various kinds of accesses. It assumes a skew of s, a pxq matrix, and M modules.

1. Accessing row i (Example)

```
Initially BASE = address A(1,1) + q(i−1)
        INDEX = s(i−1) mod q
            A = 0
            B = 1
            C = −q
```

The initial BASE, INDEX parameters start with A(i,1), and at each clock pulse, leave BASE alone, but increment INDEX. This accesses A(i,2), A(i,3) . . . When INDEX goes over q, q is subtracted from it. This corresponds to the circular shift.

2. Accessing colum j (Example)

```
Initially BASE = address of A(1,1)
        INDEX = j−1
            A = q
            B = s
            C = −q
```

The first element accessed is A(1,j). At each clock q is added to the BASE (to get to the next row) and s is added to INDEX (to account for the skewing). Again C = −q is to perform the wraparound modulo operation.

3. (Example)

Access the entire matrix in row order (i.e., access A(1,1), A(1,2) . . . A(1,q), A(2,1) . . . A(2,q), . . . A(p,1), . . . A(p,q)).

```
Initially BASE = address of A(1,1)
        INDEX = 0
```

For pq clocks generate p sets of q addresses. For each set of q clocks do:

for the first q−1 clocks $A = 0$ $B = 1$ $C = -q$ for the next clock $A = q$ $B = (s+1) \text{MOD} q$ $C = -q$ This is identical to the row read operation repeated p times, with the last clock of each row modified to shift to the beginning of the next row.

4. (Example)

Access the entire matrix in column order (i.e., access A(1,1), A(2,1) . . . A(p,1), A(1,2), . . . A(p,2) . . . A(1,q) . . . A(p,q))

```
Initially BASE = address of A(1,1)
        INDEX = 0
```

Generate q sets of p clocks.
For the first p−1 of each set $A = q$ $B = s$ $C = -q$ For the last clock of each set $A = -q(p-1)$ $B = (1-(p-1)s) \text{mod} q$ $C = -q$ This is similar to the column access mode, but with the last clock readjusting BASE and INDEX to point to the first element of the next column.

5. Access to a submatrix (in row order) (Example)

$A(r,t) \ldots \ldots A(r,t+x)$ $\vdots \qquad \qquad \vdots$ $A(r+Z,t) \ldots A(r+Z,t+x)$ (Readout by column follows naturally)

```
Initially BASE = address of A(1,1) + (r−1)q
        INDEX = (t−1+s(r−1)) mod q
```

Generate Z+1 sets of x+1 clocks where in each set of x+1 clocks:
for the first x clocks $A = 0$ $B = 1$ $C = -q$ for the next clock $A = q$ $B = (s-x) \bmod q$ $C = -q$ The following two operations deal with unskewed vectors (i.e., A(1), . . . A(q) where A(i) is stored at location i−1).

6. Take only every Nth word (Example)

| BASE | = | address of A(1) |
|---|---|---|
| INDEX | = | 0 |
| A | = | 0 |
| B | = | N |
| C | = | 0 |

Forcing C to 0 negates the modulo function 7. (Example)

Take p consecutive words, skip r words and repeat q times.

| Initially BASE | = | address of A(1) |
|---|---|---|
| INDEX | = | 0 |

Figure 9:
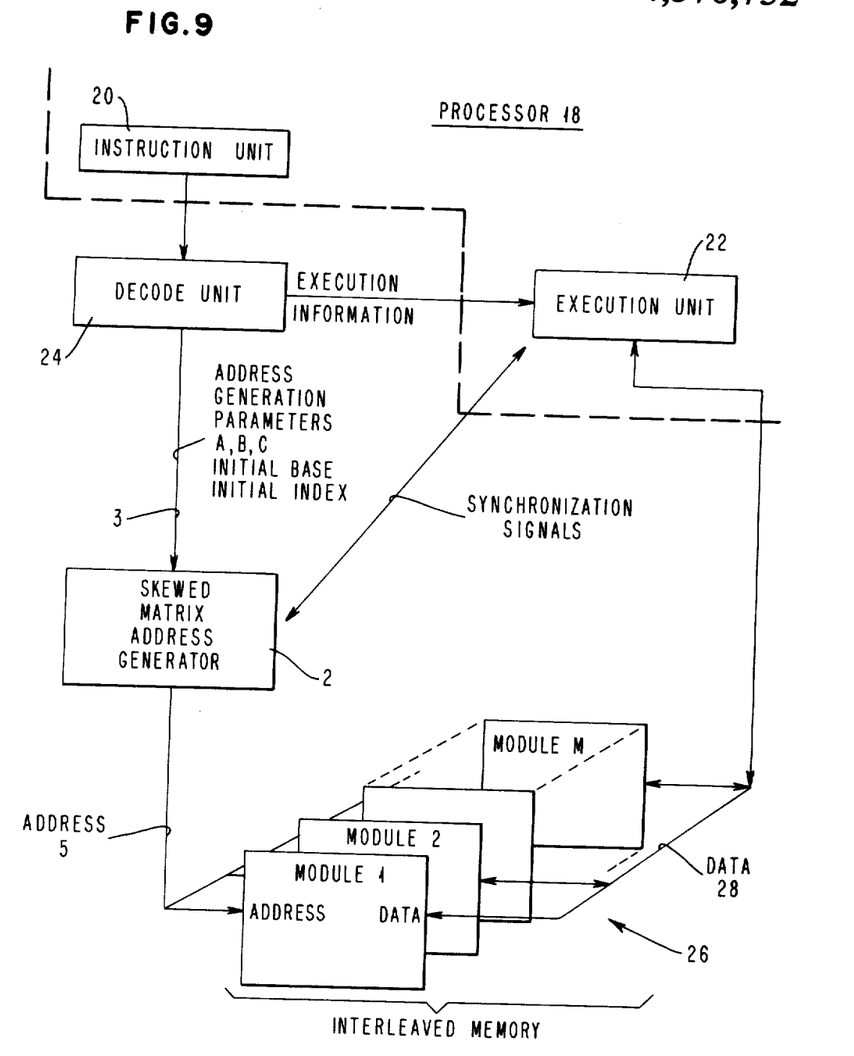
FIG. 9 is a functional block diagram of a system including processor and a set of interleaved memories, showing their connection with the skewed matrix address generator.

Generate q sets of p clocks for each set
 for first p−1 clocks $A = 0$ $B = 1$ $C = 0$ for the last clock $A = 0$ $B = r + 1$ $C = 0$ Alternative:
 for first p−1 clocks $A = 1$ $B = 0$ $C = 0$ for pth clock $A = 1 + r$ $B = 0$ $C = 0$ FIG. 9 diagrams how the skewed matrix generator 2 is incorporated into a vector or signal processor 18 of conventional design, for example, as disclosed in U.S. Pat. No. 4,149,243 by Wallis or in U.S. Pat. No. 4,041,461 by Kratz, et al., which includes an instruction unit 20 and an execution unit 22. An instruction issued from the instruction unit 20 is of the form "ADD VEC-TORS," along with designation of the two input vectors and output vector.

These vector designs include such things as:
origin of vector,
length,
dimensions of the array it is embedded in,
skew factor used, and
which dimension the vector uses.

The Decode Unit 24, upon receiving the instruction from the Instruction Unit 20, uses the vector description to initialize the Address Generator 2 over lines 3 (labeled 3a, 3b, 3c, 3d and 3e in FIG. 8) to transfer the proper vectors from the Interleaved Memory 26 into the Execution Unit 22. The Decode Unit 24 also initializes the Execution Unit 22 to perform the designed operations on the vector when they arrive over the Data Bus 28 from the Interleaved Memory 26. Completion of the operation results in data being transferred from the Execution Unit 22 back into the Interleaved Unit 26 over Data Bus 28 to locations specified by the Address Generator 2.

The resultant skewed matrix address generator 2 achieves a fast access time at the maximum speed of the Interleaved Memory 26 to various components of a matrix without any intervening processing. The skewed matrix Address Generator 2 obviates the need to change the required design of conventional Interleaved Memories 26. The operation of the skewed matrix address generator 2 enables the data accessed from the memory 26 to arrive at the processor 18 in "natural order," that is the processor 18 has to do no reordering or other processing to align the data with the normal way the data is to be used. Since memory technology speeds are increasing at a slower rate than processor logic technology, there is an increasing gap between processor and memory speeds. Although the primary technique to speed up memories is interleaving, this technique fails to solve the problem of accessing either row or column components of a matrix at the same fast rate. The skewed matrix Address Generator 2 disclosed herein solves this problem.

Although a specific embodiment of the invention has been disclosed, it will be understood by those with skill in the art that the foregoing and other changes in form and details may be made therein without departing from the spirit and the scope of the invention.

Having thus described our invention, what we claim as new, and desire to secure by Letters Patent is:

1. In an address generator for an M-interleaved memory for accessing at the memory system's maximum access rate successive elements of either a row or a column of a matrix stored in a skewed matrix pattern, apparatus for generating the sequences of appropriate memory addresses for the desired row or column, comprising:

a base register having an input connected to a first adder which adds an input value A to the contents in the base register so that the output of the adder can be stored and subsequently used as a pointer to the beginning of the current row in the matrix in memory being accessed;

an index register having an input connected to a second added for adding an input value B to the contents of the index register and that sum being conditionally added in a third adder to an input value C which sum is then stored in the index register so that it can be subsequently used as a pointer to the column element in the matrix in memory being accessed;

a fourth adder having inputs connected to the base register and the index register for generating from the row and column pointers the actual memory address of the next matrix element to be accessed;

whereby in response to a series of clock pulses a sequence of memory addresses needed to access the desired row or column will be generated with the result appearing in natural order.

2. In a vector processing system including a vector processor having an instruction unit and an execution unit responsive to instructions generated by the instruction unit to execute vector operations and a data bus connecting an M-interleaved memory to the execution unit, an address generator for the M-interleaved memory for accessing at the memory system's maximum access rate successive elements of either a row or a column of a matrix stored in a skewed matrix pattern, the address generator generating the sequences of appropriate memory addresses for the desired row or column, comprising:

a first adder having a first input connected to said instruction unit;

a base register having an input connected to the output of said first adder which adds a value A at said first input thereof to the contents in the base register, so that the output of said first adder can be stored and subsequently used as a pointer to the beginning of the current row in the matrix in memory being accessed;

a second adder having a first input connected to said instruction unit;

a third adder having a first input connected to said instruction unit;

an index register having an input connected to said second adder which adds a value B at said first input thereof to the contents of the index register, that sum being conditionally added by said third adder to an input value C at said first input thereof, which sum is then stored in said the index register, for indicating which column element in the matrix is to be accessed;

a fourth adder having inputs connected to the base register and the index register and an output connected to the address input of said memory for generating from the row and column pointers the actual memory address of the next matrix element to be accessed; a decoder connected between said instruction unit and said address generator for decoding instructions generated by said instruction unit into said values A, B, and C;

whereby in response to a series of clock pulses, a sequence of memory addresses needed to access the desired row or column will be generated with the result appearing in natural order.

* * * * *